Feb. 21, 1967  J. R. JOHNSON  3,305,075
CARTON CONVEYOR
Filed Dec. 11, 1964  5 Sheets-Sheet 4
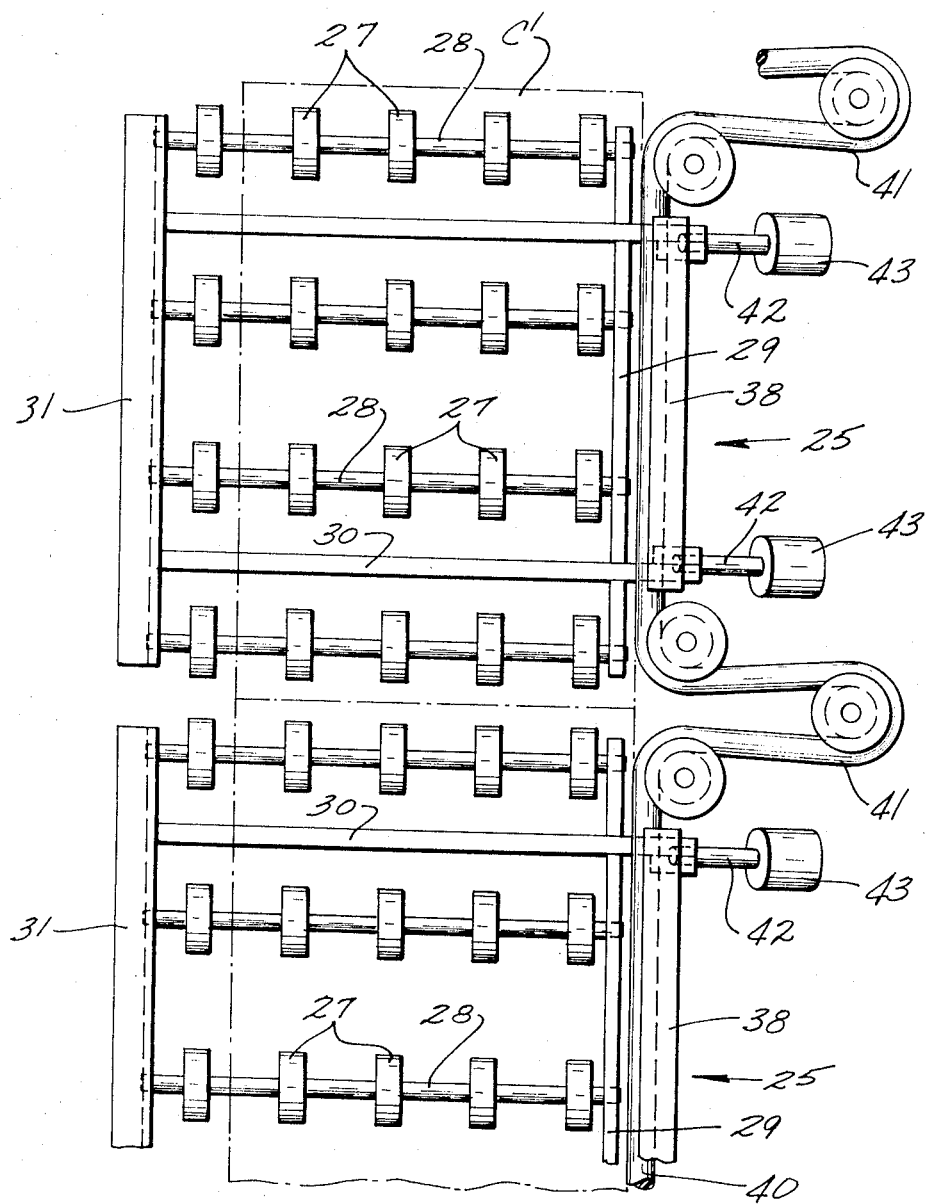
INVENTOR.
JOHN R. JOHNSON
BY
J. R. Nelson
and W. A. Schaich
ATTORNEYS Feb. 21, 1967   J. R. JOHNSON   3,305,075
CARTON CONVEYOR
Filed Dec. 11, 1964   5 Sheets-Sheet 5
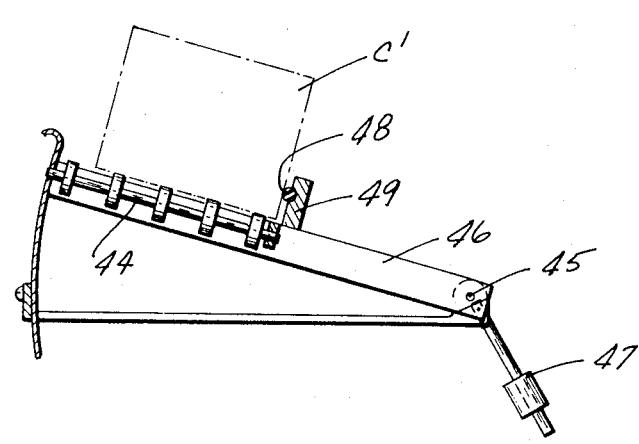
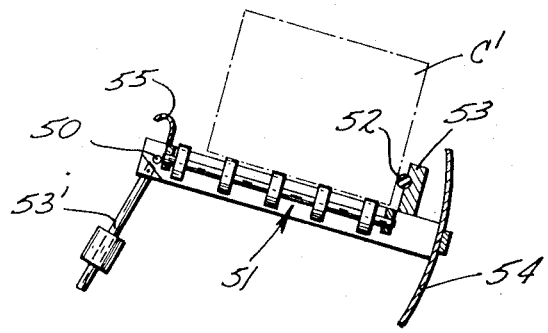
INVENTOR.
JOHN R. JOHNSON
BY J. R. Nelson
and W. A. Schaich
ATTORNEYS

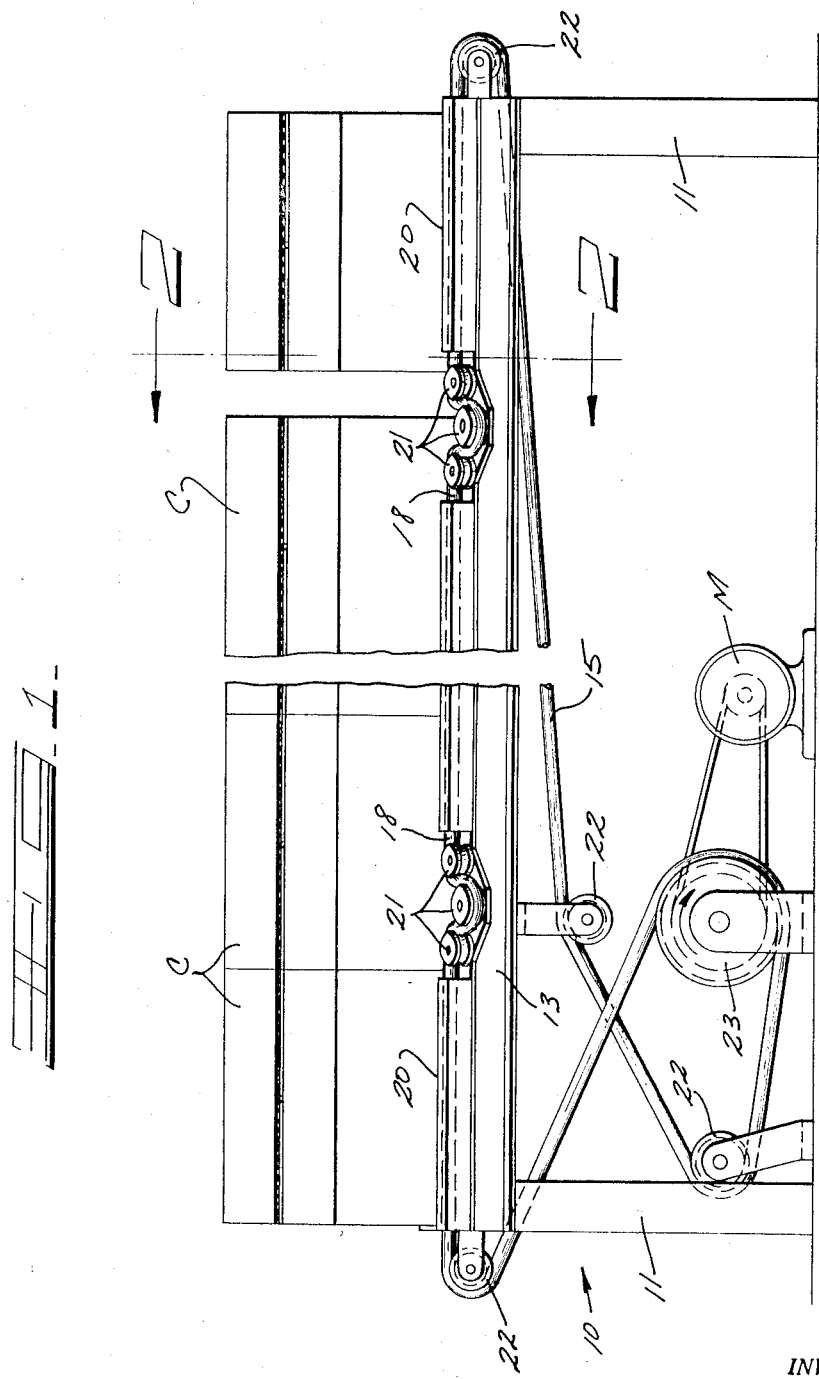

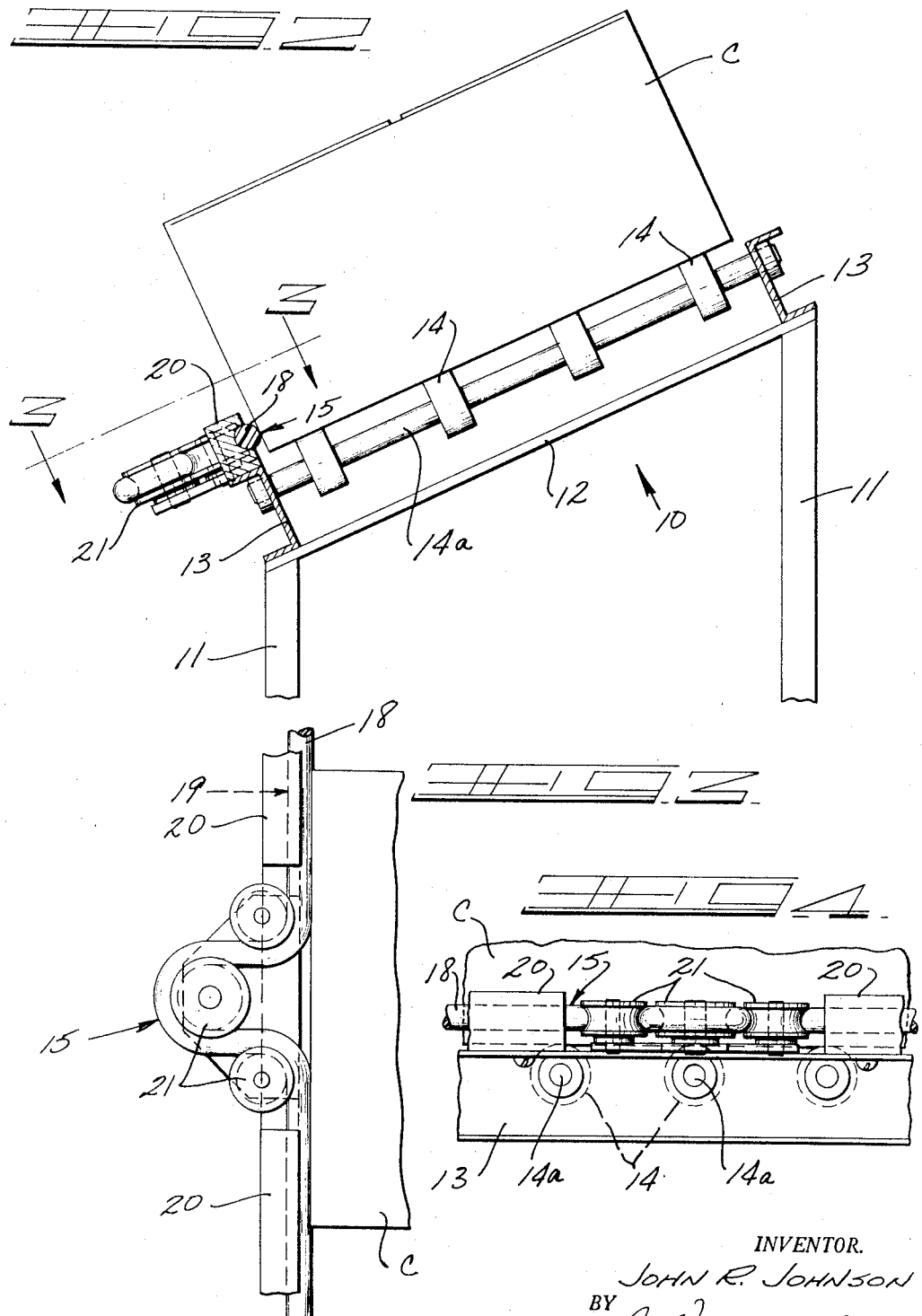

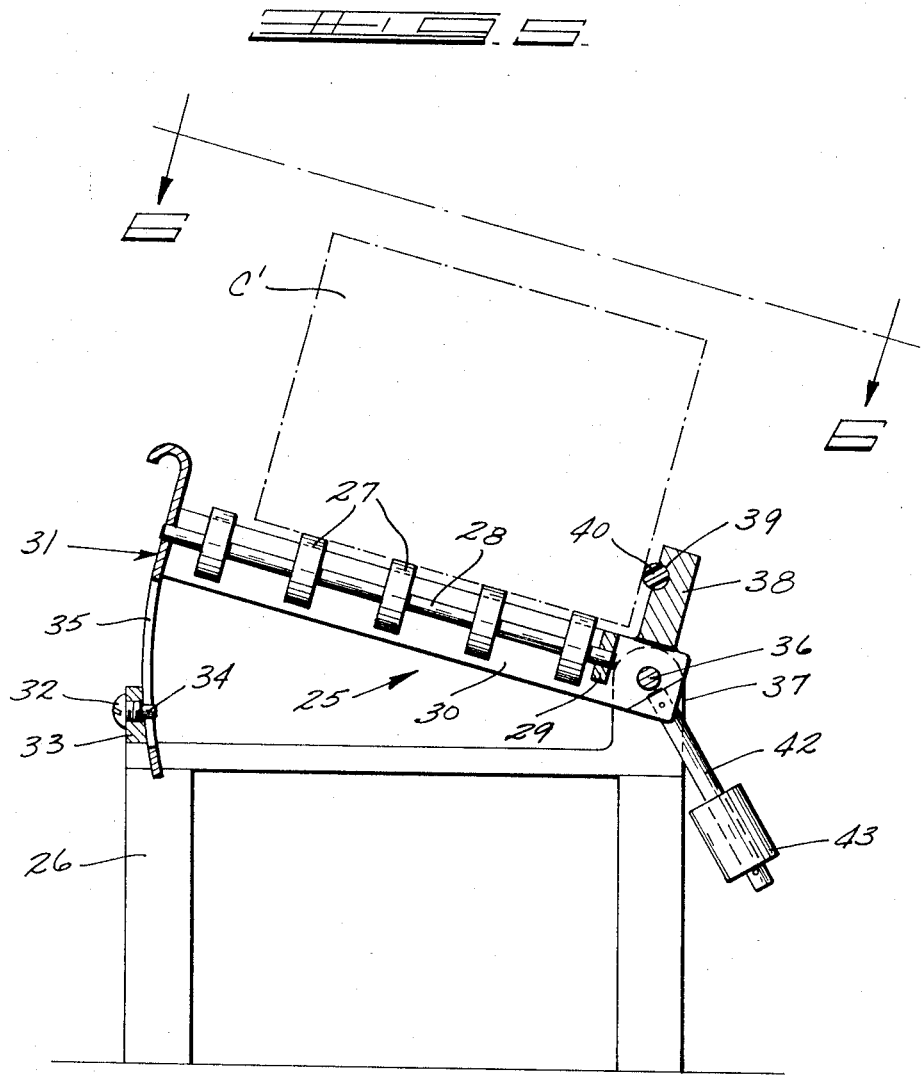

3,305,075
CARTON CONVEYOR
John R. Johnson, Toledo, Ohio, assignor to Owens-Illinois, Inc., a corporation of Ohio
Filed Dec. 11, 1964, Ser. No. 417,632
5 Claims. (Cl. 198—160)

My invention is an improved carton conveyor and has for an important object the provision of novel means utilizing the weight of the cartons themselves in regulating the driving force which advances the cartons along the selected path.

Another object of my invention is the provision of carton advancing means in which an endless rope-like element moves continuously along the lower margin of an elongated transversely inclined roller-type conveyor in such fashion that the pressure of cartons upon and in physical contact with the rope determines the effectiveness of such rope in advancing the cartons.

A further object of my invention is the provision in a carton conveyor of advancing means having a minimum area of contact with the cartons to the end that scuffing or defacing of the exterior surface, if any, is exceedingly minor in nature and extent.

It is also an object of my invention to provide a carton conveyor wherein an elongated roller-type conveyor is positioned so that one margin is lower than the other and a driven endless rope moves along the lower margin for frictional advancing engagement with only a narrow area of a lower side surface of each carton being handled.

An additional object of my invention is the provision of a carton conveyor wherein the cartons being handled rest upon and are advanced seriatim along an elongated transversely tiltable roller-type conveyor with the conveyor tiltable automatically in varying degrees in response to carton weight differences so as to correspondingly vary the pressure of such cartons upon an endless driven rope which functions to advance the cartons.

It is likewise an object of my invention to utilize counterweighted hinged sections of roller-type conveyors and a continuously driven carton engaging and advancing rope extending along the conveyor, all so related that the weight of the cartons and the counterweights in and of themselves predetermine the driving force or effectiveness of the rope as the carton propelling means.

Other objects will be in part apparent and in part pointed out hereinafter.

In the accompanying drawings forming a part of my application:

FIG. 1 is a fragmentary side elevational view of a carton conveyor embodying my invention.

FIG. 2 is a sectional elevational view taken substantially along the plane of line 2—2 of FIG. 1.

FIG. 3 is a fragmentary plan view taken about along the plane of line 3—3 of FIG. 2.

FIG. 4 is a fragmentary elevational view showing the rope tensioning device which also appears in FIG. 3.

FIG. 5 is a transverse sectional elevational view of another form of carton conveyor wherein the weight of the cartons, whether empty, or filled with merchandise, regulably determines the degree of frictional contact between the cartons and propelling rope.

FIG. 6 is a view taken substantially along the line 6—6 of FIG. 5.

FIG. 7 is a view similar to FIG. 5 showing a slight structural modification.

FIG. 8 is a view like FIG. 5 but shows a reversal of the roller-conveyor slope and the advancing rope positioned differently.

In FIGS. 1–4 I have illustrated one form of my invention wherein the conveyor is tilted transversely so as to support cartons, filled or empty, in a transversely inclined position, thereby to frictionally drivingly engage a narrow band of the lower side of the carton with a driven rope extending lengthwise of the conveyor. The weight of the cartons and angle of tilt of the conveyor determine the driving effectiveness of the rope, as is apparent.

Structurally my conveyor illustrated in FIGS. 1–4 comprises a main supporting frame 10 of any preferred length and height, such embodying legs 11, cross-members 12 connecting the legs 11 and inclined or tilted in a direction transverse to the length of the conveyor. This frame supports a pair of transversely spaced apart channel iron side members or rails 13 which in turn support a plurality of conventional rollers 14, as in the conventional roller-type conveyor. Shafts 14$^a$ journaled in the rails 13 carry these rollers 14. These rollers rotate freely and provide anti-friction supporting means for the cartons C. The cartons, as shown, occupy inclined positions upon the conveyor and their weight alone bring them into firm contact with propelling or carton advancing means which, according to the preferred form of my invention, comprises an endless rope 15, such extending lengthwise of the conveyor and so positioned as to engage only a narrow horizontal band along the lowermost side wall 16 near its juncture with the carton bottom 17.

This rope 15 preferably is formed of a suitable plastic material, such as polyethylene or polypropylene, and the working section 18 is guided in a longitudinal channel or groove 19 provided in a beam 20. This beam extends the full length of the conveyor. At intervals the working section 18 is trained over tensioning sheaves or pulleys 21 which serve the usual function of maintaining this working section 18 adequately taut. This tensioning device may, if desired, include a spring element (not shown) as is conventional practice. As illustrated, the rope 15 is trained over a series of pulleys 22 and a drum 23 which is driven by a motor M.

In operation it is apparent that cartons C are placed upon the rollers in an inclined position (FIGS. 1 and 2). Gravity lowers the cartons so that they contact the rope as illustrated. Since this rope is moving so that the working section 18 is advancing in the direction of intended movement of these cartons, they, by reason of their frictional engagement with the rope due to the carton weight, will, of course, advance as desired. The angle of inclination of the roller-conveyor, and weight of the cartons determine the degree of frictional contact between the cartons and rope and therefore the propelling effectiveness of the rope, as is apparent.

In FIGS. 5–8 I have shown other forms of my invention in which the frictional contact between the cartons and the propelling rope varies in degree automatically in response to variations in the individual carton weight. To this end the conveyor (FIGS. 5 and 6) may comprise a longitudinal series of vertically swingable roller-type conveyor sections or units 25 hinged or pivoted at one side margin to a main base frame 26. Each unit 25 may consist of a plurality of rollers 27 carried by parallel spaced apart shafts 28 which are journaled at their ends in longitudinal side members, one such member 29 being connected to cross-bars 30 at the lower margin of the unit 25, while the other opposed member 31 is an arcuate plate depending from the upper margin of the unit 25 and having pin and vertical slot connection with the base frame 26. The pin may well be a screw 32 secured in a holder 33 on the base frame 26 and having a shank 34 projecting into the vertical guide slot 35 of the arcuate plate 31. The function of this slotted plate, of course, is to guide the swinging movement of the unit 25 on its pivot or hinge which is a horizontal hinge pin 36 extending lengthwise of the conveyor at that side opposite the plate 31. The ends of this hinge pin 36 are supported in upstanding brackets 37 on the base frame 26. Immediately above the hinge pin 36 (FIG. 5) is a rope guide 38 similar to that in FIG. 2 in structure and function. It is a longitudinal bar mounted upon the unit 25 and formed with a longitudinal channel or groove 39 from end to end to guide the rope 40, leaving enough exposed for firm frictional contact with the cartons C'. As in the previously described form I employ a tensioning device 41 which maintains the working section (carton contacting) of the rope taut so that it can function effectively in propelling the cartons C'. The rope is driven in the same fashion as in the preferred form already described.

To the end that the weight of the cartons not only will directly determine the driving force of the propelling rope 38, but also provide for varying such force in response to variations in the weight of the cartons, I provide each conveyor section or unit 25 with a counterweight device. This comprises, in its illustrated form, two arms 42, each positioned at an angle to the unit 25 and carrying a counterweight 43 which may be adjusted along the arm to regulably control its effectiveness. Thus when the counterweights are properly positioned along the arms in relation to the weight or average weight of the cartons C' being conveyed, it is evident that placement of cartons upon the roller units 25 will move them on their pivots and, due to gravity, such cartons will contact the working section of the rope with the frictional degree best suited to propelling the carton along its path and with the least damage to its surface. Any appreciable variation in the carton weight will, of course, correspondingly change the angle of inclination of the roller conveyor units 25 and therefore alter the pressure of the cartons upon the propelling rope 40. Thus the degree of frictional engagement between the cartons and rope diminishes as it should when light weight cartons are being handled, the reverse being true where heavier cartons are involved.

In FIG. 7 I disclose a slightly modified form of my invention wherein the roller-conveyor unit 44 which directly supports the carton C' is spaced a substantial distance from the hinge or pivot pin 45 by reason of the longer frame member 46. Here again a counterweight unit 47 is utilized and the propelling rope 48 rides in a guide 49 extending along the conveyor as in the other forms.

In FIG. 8 I have reversed the relationship between the hinge 50 or pivot for the roller-conveyor unit 51 and the propelling rope 52 so that the latter is at the lowermost side of the unit 51, riding in a guide 53 and the hinge 50 is at the upper margin of the inclined or tilted unit 51. The counterweight 53' is beyond the hinge pin 50 and angled so as to urge the unit 51 to substantially a horizontal position. An arcuate guide plate 54 functions in the same fashion as the corresponding plate in FIG. 5. A guide plate 55 extends alongside the conveyor unit 51 just above the hinge point as an aid to proper initial placement of cartons upon the conveyor.

In view of the foregoing, it is apparent that I have provided a simple yet very effective carton conveyor arrangement which is such as to insure only the really necessary degree of frictional engagement between the cartons and propellant and in only a restricted area or zone of the cartons. Thus, as stated previously, the likelihood of surface scuffing of the cartons has been minimized, if not completely eliminated.

Modifications may be resorted to within the spirit and scope of the appended claims.

I claim:
1. In a conveyor, a plurality of rollers spaced apart along a horizontal path with the axes of the rollers inclined in a direction across said path, an article propellant comprising an endless rope-like element extending along said path in proximity to the lower end of the rollers for engagement with the article, means for driving the propellant to advance the article and means operable in response to variations in the weight of the articles conveyed for changing the angle of inclination of the rollers thereby to vary the degree of frictional contact between the articles and rope-like element and the effectiveness of the article as an article propellant.

2. The combination defined in claim 1, there being supporting means including a roller-type conveyor section, horizontal hinge means at one side margin of the section whereby said section is free to move in a plane transverse to the length of the conveyor.

3. The combination defined in claim 2 and a counterweight device operable to urge the conveyor section to assume a preselected angular position.

4. The combination defined in claim 3, there being an arcuate guide plate depending from that margin of the section opposite said hinge.

5. The combination defined in claim 3, the counterweight means being at least one arm connected to and disposed at an angle to the plane of the supporting means near its hinge and a weight mounted on each such arm.

References Cited by the Examiner

UNITED STATES PATENTS

| | | | |
|---|---|---|---|
| 574,444 | 1/1897 | Nickerson | 198—208 |
| 1,476,936 | 12/1923 | Walden | 198—182 |
| 2,405,810 | 8/1946 | Berg | 193—35 |

OTHER REFERENCES

German printed application E 9,785, September 1956.

EVON C. BLUNK, *Primary Examiner.*

RICHARD E. AEGERTER, HUGO O. SCHULZ,
*Examiners.*